United States Patent [19]

Luxon et al.

[11] Patent Number: 4,944,965
[45] Date of Patent: Jul. 31, 1990

[54] ELONGATED MOLDING GRANULES AND INJECTION-MOLDING PROCESS EMPLOYING THEM

[75] Inventors: Bruce A. Luxon, Stamford; Malalur V. Murthy, Wethersfield, both of Conn.

[73] Assignee: American Cyanamid, Me.

[21] Appl. No.: 233,582

[22] Filed: Aug. 18, 1988

Related U.S. Application Data

[60] Continuation of Ser. No. 939,597, Dec. 9, 1986, abandoned, which is a division of Ser. No. 744,363, Jun. 13, 1985, abandoned.

[51] Int. Cl.$^5$ .............................................. B05D 3/02
[52] U.S. Cl. ................................. 427/389.7; 427/358; 427/389.8; 427/389.9
[58] Field of Search ............... 427/389.7, 389.8, 389.9, 427/387, 212, 388.2, 358; 65/3.1

[56] References Cited

U.S. PATENT DOCUMENTS

| | | | |
|---|---|---|---|
| 2,824,780 | 2/1958 | Satterthwaite | 18/54 |
| 2,877,501 | 3/1959 | Bradt | 18/55 |
| 3,002,804 | 10/1961 | Kilian | 264/178 |
| 3,822,333 | 7/1974 | Haruta et al. | 264/179 |
| 3,850,681 | 11/1974 | Marzocchi | 427/389.7 X |
| 3,993,805 | 11/1976 | Roberts | 427/389.7 X |
| 4,029,623 | 6/1977 | Maaghul | 260/29.6 RW |
| 4,157,420 | 6/1979 | Bourrain et al. | 428/392 |
| 4,477,496 | 10/1984 | Das et al. | 427/375 |
| 4,522,967 | 6/1985 | Sheldon et al. | 524/377 |

*Primary Examiner*—Thurman K. Page
*Attorney, Agent, or Firm*—Steven Flynn

[57] ABSTRACT

Elongated granules of reinforcing fibers extending generally parallel to each other longitudinally of the granule substantially uniformly dispersed throughout a thermally stable, readily melting, film forming thermoplastic adhesive, providing complete dispersion of the fibers during an injection molding cycle, conserving physical properties and providing significantly better EMI shielding than prior art extruder compounded resin/fiber blends.

19 Claims, 2 Drawing Sheets

4,944,965

ELONGATED MOLDING GRANULES AND INJECTION-MOLDING PROCESS EMPLOYING THEM

This is a continuation of application Ser. No. 6/939,597 filed Dec. 9, 1988, now abandoned which is a division of co-pending application Serial No. 744,363, filed June 13, 1985 now abandoned.

The present invention relates to reinforcing filament bundles in the form of elongated granules and to their use in dispersing fibers in thermoplastic resins during injection molding processes.

BACKGROUND OF THE INVENTION

Fiber filled plastic compounds suitable for injection molding have become widely used. The fibers impart many valuable characteristics to the injection molded articles, foremost of which are high dimensional stability, high modulus of elasticity, high resistance to distortion by heat, high tensile strength, unusually high flexural modulus and low shrinkage during curing. Glass-reinforced thermoplastic injection molding compounds and injection molding processes employing them are described in Bradt, U.S. Pat. No. 2,877,501. The technology of the Bradt patent has subsequently been extended. In addition to the styrene resins, styrene-acrylonitrile copolymer resins and styrene-butadiene copolymer resins described therein, numerous other injection-moldable thermoplastic resins, such as polycarbonate resins, acrylonitrile-butadiene-styrene terpolymer resins, poly (ethylene terephthalate) resins, polysulfone resins, polyphenylene ether resin, nylon resins, and the like, are effectively reinforced by glass fibers. Moreover, instead of glass fibers, subsequently developed commercial products are reinforced with filaments of carbon fibers, graphite fibers, aramid fibers, stainless steel filaments and others, as well as mixtures of any of the foregoing, many such products stemming directly from the technology disclosed in the above-mentioned U.S. Pat. No. 2,877,501. Such technology involves providing elongated granules, each of the granules containing a bundle of elongated reinforcing filaments extending generally parallel to each other longitudinally of the granule and a thermoplastic molding composition surrounding and permeating the bundle. In the process of injection molding, such granules are forced into a mold, wherein the filaments will be dispersed and produce molded articles with improved properties in comparison with the molded thermoplastic alone.

The above-mentioned U.S. Pat. No. 2,877,501, discloses pellets comprising 15-60 wt. % glass in thermoplastic resin, e.g., polystyrene. This corresponds to 8.1%-42.9% of filaments by volume and correspondingly 91.9-57.1% by volume of resin. Current processes for making such prior art filament-filled granules require a compounding/pelletizing step, in which the thermoplastic material is mixed with filaments, usually chopped bundles of filaments, and usually in an extruder, then the extrudate is chopped into molding granules. Such equipment is not readily available to the molder, and a number of specialty compounders have established businesses in which fibers from one source, and thermoplastics from another source are formulated into granules in drums or truckloads for sale to molders. It would be desirable to by-pass such compounders and permit molders to feed mixtures of thermoplastics and fibers directly into the molding press hopper achieving fiber dispersion by shear forces at the screw, nozzle, check valve, runners, gates, etc., in the injection molding machine. It would also be desirable to use, in comparison with the prior art, much less resin in the pellets, e.g., 2.5–32.5% by volume (instead of 57.1–91.9%) and much higher filament loadings, e.g., 67.5–97.5% by volume (instead of 8.1–42.9% by volume). However, until the present invention, this has not been possible because the fiber or filament bundles separate during chopping and tumbling with the reduced volume fractions of resin. There is also a tendency for the resin to degrade if the temperature is raised to lower viscosity and enhance dispersion. Moreover, individual fibers can become airborne and cause problems in handling.

The improved elongated granule of the present invention solves such problems by substituting for the thermoplastic matrix separating and coating the fiber bundles, in the prior art, a much thinner layer of an efficient thermoplastic adhesive, which acts as a binder. As will be shown, such a judiciously selected binder will hold the fiber bundle together sufficiently to prevent broken bundles during chopping into elongated pellets and tumbling with the resin to be reinforced, and then the adhesive binder will readily break down in the presence of molten resin and thereafter not interfere with fiber dispersion, or degrade the resin properties, or constitute an environmental hazard.

As will be seen, the molding process itself can be used to disperse the resin uniformly throughout the molded part thus avoiding the compounding/pelletizing step.

As a decidedly unexpected advantage, and to further demonstrate the importance of the present invention, greater and more uniform dispersions of the fibers are achieved. It has been found that when using electrically conductive fibers, such as nickel coated graphite fibers, superior electromagnetic shielding is obtained at equal load levels (compared with compounded pellets), providing better shielding at one-half the cost, and, in comparison with the use of conductive, e.g., silver, paint there is much less or no secondary finishing with equivalent or better shielding, for superior physical properties, and superior long term reliability.

SUMMARY OF THE INVENTION

In accordance with the invention, there are provided injection molding compounds comprising elongated granules, each of the granules containing a bundle of elongated reinforcing filaments extending generally parallel to each other longitudinally of the granule and substantially uniformly dispersed throughout the granule in a thermally stable, film forming thermoplastic adhesive which substantially surrounds each filament.

Also contemplated by the invention are mixed injection molding compositions comprising:
(i) thermoplastic resin molding granules; and
(ii) elongated granules comprising 67.5–97.5% by volume of reinforcing filaments extending generally parallel to each other longitudinally of each of the granules and substantially uniformly dispersed throughout the granule in from 2.5 to 32.5% by volume of a thermally stable, film forming thermoplastic adhesive, the amount of component (ii) in the composition being sufficient to provide 5–60% by weight of the filaments per 100% by weight of (i) plus (ii).

It is a further feature of the invention to provide a method of manufacturing an injection molding compound comprising the steps of continuously passing reinforcing filaments through one or more baths of a thermally stable, film forming thermoplastic adhesive in a solvent, e.g., water, to impregnate the filaments, passing the impregnated filaments through a sized opening to remove any excess adhesive, passing the impregnated filaments into a heating zone first to evaporate the solvent and then to flux the thermoplastic adhesive, and withdrawing the treated filaments from the heating zone and thereafter chopping them into elongated granules, whereby there are produced granules comprising 67.5–97.5% by volume of reinforcing filaments extending generally parallel to each other longitudinally of the granule, substantially uniformly dispersed throughout said granule in from 2.5–32.5% by volume of a thermally stable, film forming thermoplastic adhesive which substantially surrounds each said filament.

In still another aspect, the present invention contemplates as an improvement in the process of injection molding, the step of forcing into a mold an injection molding composition comprising a blend of:
(i) thermoplastic molding granules; and
(ii) an amount effective to provide reinforcement of elongated granules, each of the granules containing a bundle of reinforcing filaments extending generally parallel to each other longitudinally of the granule substantially uniformly dispersed in a thermally stable, film forming thermoplastic adhesive which substantially surrounds each said filament.

DETAILED DESCRIPTION OF THE INVENTION

Figure 1:
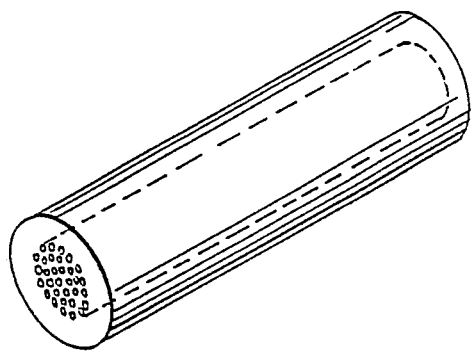
FIG. 1 is a somewhat idealized isometric view, on an enlarged scale, of a molding granule of the prior art.
Figure 3:
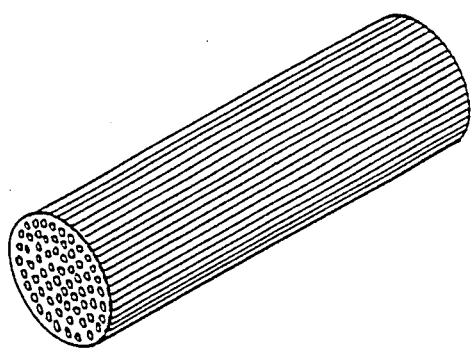
FIG. 3 is a somewhat idealized isometric view, on an enlarged scale, of a molding granule according to this invention, showing closer packing and no overcoat.
Figure 2:
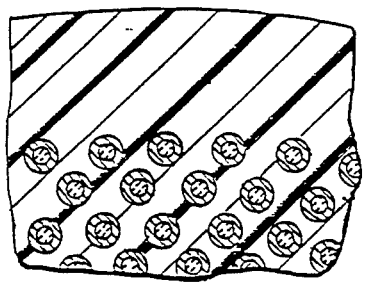
FIG. 2 is a somewhat idealized, fragmental cross-section of a molding granule of the prior art on a still further enlarged scale.
Figure 4:
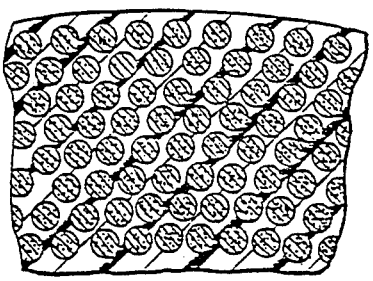
FIG. 4 is a somewhat idealized, fragmental cross-section of a molding granule of this invention on a still further enlarged scale.

Referring to the drawing, FIGS. 3 and 4, each filament contained in the injection molding granule is surrounded by and the bundle is impregnated by the thermally stable, film forming thermoplastic adhesive. The pellet itself may be of cylindrical or rectangular or any other cross-sectional configuration, but preferably is cylindrical. The length of the granules can vary, but for most uses, ⅛ inch–¾ inch will be acceptable and ⅛ inch–¼ inch will be preferred. The differences between the pellets of this invention and those of the prior art can be seen by comparison of FIG. 1 with FIG. 3 and FIG. 2 with FIG. 4, respectively. Unlike the prior art (FIGS. 1 and 2) the pellets of this invention have close-packed filaments and the thermoplastic adhesive jacket is substantially dispersed upon contact with hot molten thermoplastic in the present invention. On the other hand, the prior art pellets will not readily separate into reinforcing filaments because of interference by the relatively thick jacket of thermoplastic resin.

Instead of using a lot of resin to impregnate the fiber bundle and surround it, as is done in the prior art, it is essential to use an adhesive efficient for the purposes of the invention, and that is to bind a high proportion of filaments into each elongated granule and maintain them throughout the chopping process. The adhesive preferably will be used also in an amount which is not substantially in excess of that which maintains the fiber bundle integrity during chopping. This amount will vary depending on the nature of the fibers, the number of fibers in the bundle, the fiber surface area, and the efficiency of the adhesive, but generally will vary from 2.5 to 32.5% and preferably from 5 to 15% by volume of the granule.

For uniform adhesive pick up on the fibers in the bundle it is preferred to use a small, but effective amount of a conventional coupling agent, which also enhances bonding to numerous different substrates. Aminosilanes are preferred for this purpose, the only requirement being that they be miscible with any solvent system used for impregnation and compatible with the thermoplastic film forming adhesive. A preferred aminosilane is N (2-aminoethyl)-3-aminopropyltrimethoxysilane (available from Dow-Corning corp. under the trade designation Z 6020). Also suitable are gamma-methacryloxypropyltrimethoxysilane and gamma-chloropropyltrimethoxysilane.

It is a preferred feature of the invention also to include in the adhesive a small, but effective amount of a plasticizer. This is helpful to soften and reduce the melting point (glass transition temperature, Tg) of the adhesive, and to facilitate blending and molding with the lower melting thermoplastics, e.g., acrylonitrile-butadiene-styrene (ABS) terpolymer resins. As with the coupling agent, the only critical requirements are that the plasticizers be miscible with any solvent system used for impregnation and compatible with the film forming adhesive.

Careful consideration should be given to selection of the film forming thermoplastic adhesive, subject to the above-mentioned parameters. Some adhesives are more efficient than others, and some, which are suggested for use as fiber sizings in the prior art will not work. For example, poly(vinyl acetate) and poly(vinyl alcohol), the former being suggested by Bradt in U.S. Pat. No. 2,877,501, as a sizing, do not work herein because, it is believed, thermosetting or cross linking occurs and this operates to prevent rapid melting and complete dispersion in the injection molding machine. While such materials are suitable for the resin rich compounded granules used in the the Bradt patent, they are unsuitable herein.

Much preferred are a class of resins comprising poly ($C_2$–$C_6$ alkyl oxazolines). These are somewhat structurally related to N,N-dimethylformamide (DMF) and have many of its miscibility properties. A readily available such polymer is poly(2-ethyl oxazoline), Dow Chemical Co. PEOx. This can also be made by techniques known to those skilled in this art. Poly(2-ethyl oxazoline) is a thermoplastic, low viscosity, water-soluble adhesive. It can be used in the form of amber-colored and transparent pellets 3/16" long and ⅛" diameter. Typical molecular weights are 50,000 (low); 200,000 (medium) and 500,000 (high). Being water soluble, it is environmentally acceptable for deposition from aqueous media. It also wets the fibers well because of low viscosity. It is thermally stable up to 380° C. (680° F.) in air at 500,000 molecular weight. When used as an adhesive for fiber bundles, it does not fracture appreciably during chopping to minimize free filaments from flying about, which can be a safety hazard. When blended with pellets of a thermoplastic resin system, this material will melt readily allowing complete dispersion of the fibers throughout the resin melt while in a molding machine. However, pellets bound with this thermoplastic adhesive are indefinitely stable with the resin pellets during blending, and don't break apart prematurely.

As a result of a number of trials, the invention as currently practiced provides optimum results when the following guidelines are adhered to:

The fiber type can vary, any fiber being known to be useful as a filler or reinforcement in a resin system can be used. Preferred fibers are carbon or graphite fibers, glass fibers, aramid fibers, stainless steel fibers, metal coated graphite fibers, or a mixture of any of the foregoing.

The preferred thermoplastic adhesive comprises poly(ethyloxazoline), having a molecular weight in the range of about 25,000 to about 1,000,000, preferably 50,000–500,000, most preferably about 50,000.

It is preferred that the adhesive be deposited onto the filaments from a solvent system which can comprise any polar organic solvent, e.g., methanol, or mixture of such solvents, or water, alone, or in admixture. Acceptable bath concentrations for the thermoplastic adhesive can vary but is generally in the range of 2.5–12% by weight, preferably 2.5–6%, and especially preferably 2.5–4% by weight.

If a plasticizer is used, this too can vary in type and amount, but generally a poly($C_2$–$C_6$ alkylene glycol) is used, such as a poly(ethylene glycol) or poly(propylene glycol), e.g., a CARBOWAX ® from Union Carbide Corp. Acceptable molecular weights range from 200 to 600, with 200–400 being preferred and 300 most preferred. Bath concentrations can range from 0.1 to 0.5%, preferably from 0.3 to 0.5%, by weight.

If a coupling agent is used, this will preferably be an aminosilane, preferably N-(2-aminoethyl)-3-aminopropyltrimethoxysilane. The bath concentration of the coupling agent can vary widely, but in general is from 0.1 to 1.0% by weight, preferably 0.25 to 0.75% by weight, most preferably 0.5% by weight.

The amount of non-filament material in the filament-containing granules of the invention will vary, but, in general, will range from 2.5 to 32.5% by volume with any fiber, preferably from 5 to 15% by volume.

The non-filament content in the elongated fiber-containing pellets, by component, is as follows, 60–100% by weight of adhesive, 80% preferred; 20–0% of plasticizer, 8% preferred, and 40–0% of coupling agent, 12% preferred.

The length of the elongated granule will generally range from ⅛ to ¾ inch, preferably from ⅛ to ¼ inch. The diameters of each elongated granule can vary, depending primarily on the number of filaments and the thickness of each filament in the bundle. Typically, thicknesses will vary from about one-forty-eighth to about three-sixteenths inch in diameter. Preferably, the diameter will be in the range of from about one-thirty-second to about one-eighth inches in diameter.

Numerous thermoplastic resins can be employed with the elongated granules of the present invention. In general any resin that can be injection molded and that can benefit from a uniform dispersion of fibers can be used. For example polystyrene, styrene/acrylic acid copolymer, styrene/acrylonitrile copolymer, polycarbonate, poly (methyl methacrylate) poly(acrylonitrile/butadiene/styrene), polyphenylene ether, nylon, poly(1,4-butylene terephthalate), mixtures of any of the foregoing, and the like, can be used.

Figure 5A:
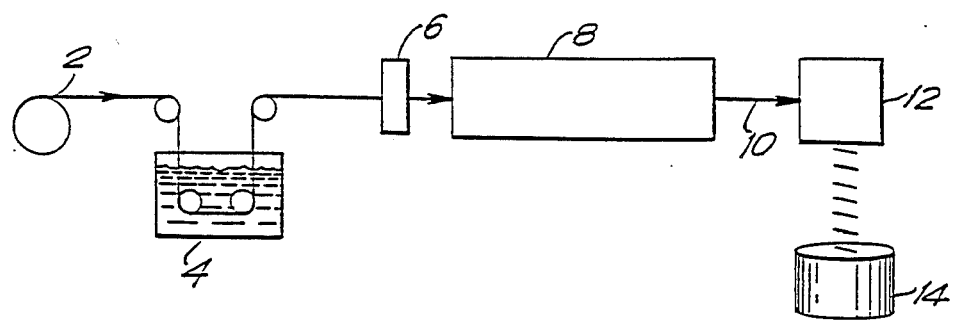
FIG. 5a is a semi-schematic diagram showing a preferred way of making the elongated molding pellets of this invention.

It is preferred to manufacture the injection molding composition of this invention by a continuous process. A suitable apparatus is shown in FIG. 5a. Typically, bundles of filaments, such as graphite fiber tows or metal coated graphite fiber tows, 3,000 to 12,000 filaments per bundle, glass yarns, 240 filaments to a strand, or stainless steel tow, 1159 filaments per bundle, are drawn from storage roller 2 and passed through one or more baths 4, containing the thermally stable, film forming thermoplastic adhesive in a solvent medium, e.g., water, to impregnate the filaments, then through die 6, to control pick up. The impregnated filaments thereafter are passed into a heating zone, e.g., oven 8, to evaporate the solvent, e.g., water and then to flux the thermoplastic adhesive. The treated filaments 10 are withdrawn from the heated zone, transported to chopper 12 and cut into fiber pellets illustratively varying between ⅛–¼" according to the requirements of the particular apparatus. The pellets are then stored in a suitable container 14 for subsequent use. Any coupling agent and/or plasticizers can be deposited from separate baths, but conveniently they are included in a single bath with the adhesive. It will be observed that this procedure results in the orientation of the reinforcing fibers along one axis of the granule.

Figure 5B:
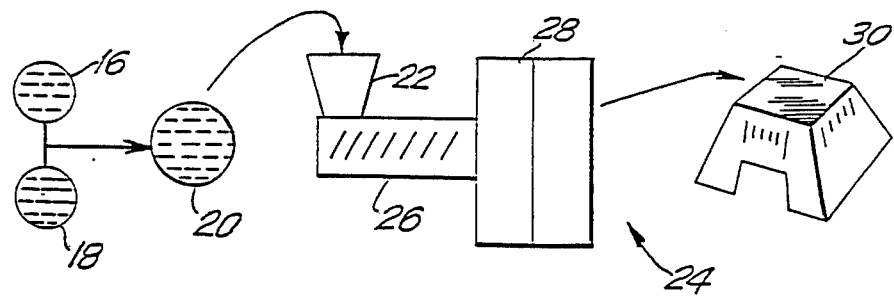
FIG. 5b is a semi-schematic drawing illustrating the way in which the pellets of this invention are mixed and molded into shaped articles.

To carry out the molding method of the present invention, a flow diagram in the general form illustrated in FIG. 5b is preferably employed. Fiber pellets 16 are mixed with resin pellets 18 to produce a blended mixture 20. This is added to conventional hopper 20 on molding press 24. When passing through cylinder 26, prior to being forced into mold 28 a uniform dispersion of the fibers is accomplished. Removal of molded article 30 provides a fiber reinforced item produced according to this invention.

It is understood that other plasticizers, mold lubricants, coloring agents, and the like, can be included, and that the amount of reinforcement in the components can be varied according to well-understood techniques in this art.

DESCRIPTION OF THE PREFERRED EMBODIMENTS

The following are examples of the present invention but are not to be construed to limit the claims in any manner whatsoever. The electrical mesaurements (Shielding effectiveness (SE) values in decibels ) are averages usually of four samples.

EXAMPLE 1

Using an apparatus of the type generally shown in FIG. 5a a bath comprising the following is formulated:

| Component | % by weight |
| --- | --- |
| poly(ethyl oxazoline), MW 50,000 | 4.0 |
| poly(ethylene glycol), MW 300 | 0.3 |
| N-(2-aminoethyl)-3-amino-propyltrimethoxy-silane | 0.4 |

| Component | % by weight |
|---|---|
| Water | 95.3 |

A tow of continuous graphite fibers (12,000 count) each of which has an electroplated nickel coating thereon is led through the bath. The graphite filaments each average about 7 microns in diameter. The nickel-coating thereon is approximately 0.5 microns in thickness. The nickel coated graphite tows are prepared by continuous electroplating in accordance with the procedure described in European Patent Application No. 0088884 (published September 21, 1983). After passing out of the coating bath the treated fibers are drawn through 60 mil die then passed through an oven at about 300° F. The impregnated filaments then are chopped to ¼" lengths and there are produced elongated granules of approximately 1/16" in diameter of cylindrical shape and form. The non-filament material content is 9% by volume.

EXAMPLE 2

Using the process generally shown in FIG. 5b, sufficient of the elongated pellets produced in Example 1 are blended with pellets of a thermoplastic molding resin composition comprising poly(2,6-dimethyl-1,4-phenylene ether) and high impact polystyrene (HIPS) (General Electric Co. NORYL® N-190) to provide 10 weight percent of nickel-coated graphite filaments in the blend. The blended mixture is molded in an injection molding press into work pieces suitable for physical and electrical testing. The electromagnetic shielding effectiveness (SE) and EMI attenuation are measured to determine dispersion efficiency for comparison with the prior art at the same filament loading.

EXAMPLES 3 AND 4

The procedure of Example 2 is repeated, substituting sufficient of the elongated pellets of Example 1, respectively, to provide 15% and 20% by weight of nickel-coated graphite filaments in the blend, and For comparison purposes, molding pellets according to the prior art are prepared, containing nickel-coated graphite dispersed in an extruder to a level of 10, 15 and 20 weight percent in polyphenylene ether/styrene resin, and workpieces suitable for measuring SE are produced.

The Electro-Metrics Dual Chamber test fixture was used according to ASTM ES7-83 to measure the shielding effectiveness (SE) of the compositions of Examples 2-4 of this invention, for comparison with extrusion compounded pellets of the prior art. The results are set forth in Table 1:

TABLE 1

Shielding Effectiveness Polyphenylene Ether/
HIPS Containing Nickel-Plated Graphite Filaments

| EXAMPLE | 2 | 2A* | 3 | 3A* | 4 | 4A* |
|---|---|---|---|---|---|---|
| Composition (parts by weight) | | | | | | |
| Polphenylene ether/high impact polystyrene | 90 | 90 | 85 | 85 | 80 | 80 |
| Nickel-coated graphite chopped filaments, ¼" | — | 10 | — | 15 | — | 20 |
| Elongated film bonded bundles (Examples 2-4) | 10 | — | 15 | — | 20 | — |
| Shielding Effectiveness, decibels @ | | | | | | |
| 30 MHz | 34 | 13 | 59 | 40 | 69 | 52 |
| 100 MHz | 27 | 12 | 50 | 29 | 62 | 36 |
| 300 MHz | 34 | 30 | 61 | 32 | 73 | 50 |
| 1000 MHz | 17 | 12 | 64 | 14 | 75 | 30 |

*Controls

These data are especially noteworthy because each 10 dB of attenuation represents an order of magnitude. Therefore, a difference of 20 dB between two readings is actually a factor of 100 and a difference of 50 dB is a factor of 100,000. The data for the compositions made using elongated granules of this invention are far superior to the compounded plastic/fiber of the control. The 10% NCG data of Examples 2 is as good as the 15% compounded comparison 3A* data and the 15% data of Example 3 is better than the 20% compounded comparison 4A* data. Such differences are significant—as much as 50 dB.

EXAMPLE 5

The procedure of Example 2 is repeated substituting for the thermoplastic resin pellets, pellets comprising poly(acrylonitrile/butadiene/styrene) (Borg Warner CYCOLAC® KJB) resin and plaques suitable for measuring SE effect are molded.

EXAMPLE 6

The procedure of Example 2 is repeated but poly(bisphenol-A carbonate) resin pellets (General Electric LEXAN® 920) are substituted, and plaques suitable for measuring SE are prepared.

EXAMPLES 7-9

The procedure of Example 1 is repeated, substituting for the nickel coated graphite tows, tows of uncoated graphite fibers (Example 7), glass fibers, 240 filaments/strand (Example 8), and stainless steel fiber tows comprising 1159 count filaments each measuring about 7 microns in diameter (Example 9). Elongated granules according to this invention were prepared, comprising about 85 to 95% by volume of the respective filaments.

EXAMPLE 10

The procedure of Example 2 is repeated but poly(bisphenol-A carbonate) resin pellets are substituted, and elongated fiber pellets of stainless steel fibers (Example 9) are substituted to provide 15% by weight. Plaques for measuring SE properties and test pieces for strength testing were preferred.

The Shielding Effectiveness of the compositions molded from the mixtures of Examples 5, 6 and 10 were measured by ASTM ES7-83 as described above, compared with compositions melt blended on a compounding extruder, as in the prior art, before injection molding, and the data are set forth in Table 2:

TABLE 2

Shielding Effectiveness of Polycarbonate and
ABS Resins Containing Nickel Coated Graphite
and Stainless Steel Filaments

| Example | 5 | 5A* | 6 | 6A* | 9 |
|---|---|---|---|---|---|
| Compositions (parts by weight) | | | | | |
| poly(bisphenol-A) carbonate | — | — | 90 | 90 | 90 |
| poly(acrylonitrile/butadiene/styrene) | 90 | 90 | — | — | — |
| nickel coated graphite | 10 | — | 10 | — | — |

TABLE 2-continued

Shielding Effectiveness of Polycarbonate and ABS Resins Containing Nickel Coated Graphite and Stainless Steel Filaments

| Example | 5 | 5A* | 6 | 6A* | 9 |
|---|---|---|---|---|---|
| elongated film bonded bundles nickel coated graphite | — | 10 | — | 10 | — |
| chopped tows | | | | | |
| stainless steel elongated film bonded bundles | — | — | — | — | 15 |
| Shielding Effectiveness, decibels @ | | | | | |
| 30 MHz | 21 | 18 | 30 | 13 | 35 |
| 100 MHz | 19 | 17 | 29 | 12 | 25 |
| 300 MHz | 38 | 35 | 40 | 34 | 37 |
| 1000 MHz | 12 | 12 | 20 | 10 | 16 |

*Melt blended on a compounding extruder before injection molding.

Again, significant enhancement of SE data are obtained after using the bonded bundles according to the present invention.

EXAMPLES 11-14

The general procedure of Example 2 is used to formulate and mold physical strength test pieces from polycarbonate resin and the film bonded pellets according to this invention of Examples 1, 7, 8 and 9. The compositions used and the results obtained are set forth in Table 3:

TABLE 3

Compositions of Aromatic Polycarbonate and Film-Bonded Pellets of Nickel Coated Graphite, Graphite, Glass and Stainless Steel Filaments

| EXAMPLE | 11 | 11A* | 11B* | 12 | 13 | 14 |
|---|---|---|---|---|---|---|
| Composition (parts by weight) | | | | | | |
| poly(bisphenol-A carbonate) | 85 | 100 | 85 | 85 | 85 | 85 |
| nickel-coated graphite fiber film bonded pellets (Example 1) | 15 | — | — | — | — | — |
| nickel-coated graphite chopped fibers | — | — | 15 | — | — | — |
| graphite fiber film bonded pellets (Example 7) | — | — | — | 15 | — | — |
| Glass fiber film bonded pellets (Example 8) | — | — | — | — | 15 | — |
| Stainless steel fiber film bonded pellets (Example 9) | — | — | — | — | — | 15 |
| Properties** | | | | | | |
| Tensile Strength (ksi) | 13.1 | 8.5 | 11.1 | 16.6 | 11.6 | 8.6 |
| Tensile Modulus (Msi) | 1.06 | 0.32 | 0.97 | 1.62 | 0.73 | 0.48 |

*Control
**Control — melt blended on a compounding extruder before injection molding.
***Test method ASTM D-638.

The tensile strength and modulus of the molded articles are very favorably influenced by using film bonded pellets according to the present invention.

In making the elongated pellets of this invention, other fibers can be substituted, e.g., aramid fiber, e.g., KEVLAR ® fiber, ceramic fiber, or combinations of any of the foregoing such fibers. Aramid fiber is particularly interesting because it is virtually impossible to chop and blend with thermoplastic resins because it frays and birdnests. When prepared in the form of coated bundles herein, aramid fiber chops very well and mixes easily.

The foregoing patents and publications are incorporated herein by reference.

Many variations of the present invention will suggest themselves to those skilled in the art in light of the foregoing detailed description. All such obvious variations are within the full intended scope of the appended claims.

What is claimed is:

1. A method of manufacturing injection molding granules of dispersible filaments comprising the steps of continuously passing reinforcing filaments through at least one bath of a thermally stable, readily melting film forming non-crosslinkable thermoplastic adhesive, which substantially disperses on contract with hot molten plastic, in a liquid medium to impregnate the filaments, passing the impregnated filaments through a sized opening to remove any excess adhesive, passing the treated filaments into a heated zone first to evaporate the liquid medium and then to flux the thermoplastic adhesive, and withdrawing the treated filaments from said zone and thereafter chopping them into elongated granules whereby there are produced granules comprising 67.5-97.5% by volume of reinforcing filaments extending generally parallel to each other longitudinally of the granule and substantially uniformly dispersed throughout said granule in from 2.5-32.5% by volume of said thermoplastic adhesive which substantially surrounds each of said filament.

2. A method as defined in claim 1 wherein said granules are chopped to form about one-forty-eighth to about three-sixteenths inches in diameter.

3. A method as defined in claim 2 wherein said granules are chopped to form about one-thirty second to about one-eighth inches in diameter.

4. A method as defined in claim 1 wherein the amount of thermoplastic adhesive is not substantially in excess of that which maintains fiber bundle integrity during handling.

5. A method as defined in claim 1 wherein the reinforcing filaments comprise from 85 to 95% by volume and the thermally stable, film forming adhesive comprises correspondingly from 5-15% by volume.

6. A method as defined in claim 1 including treating each of the reinforcing filaments with a coupling agent.

7. A method as defined in claim 1 including providing the thermoplastic adhesive with a compatible polymeric plasticizer in an amount sufficient to lower the melting temperature of said adhesive to provide improved dispersion in lower melt temperature resins.

8. A method as defined in claim 1 wherein the thermally stable, film forming thermoplastic adhesive comprises a poly($C_2$–$C_6$ alkyl oxazoline, alone, or in further combination with a polymeric plasticizer comprising a poly($C_2$–$C_6$ alkylene glycol).

9. A method as defined in claim 1 wherein said reinforcing filaments comprise graphite fibers, glass fibers, aramid fibers, stainless steel fibers, metal coated graphite fibers or a mixture of any of the foregoing.

10. A method as defined in claim 9 wherein the reinforcing filaments comprise graphite fibers.

11. A method as defined in claim 9 wherein the reinforcing filaments comprise nickel coated graphite fibers.

12. A method as defined in claim 9 wherein the reinforcing filaments comprise glass fibers.

13. A method as defined in claim 9 wherein the reinforcing filaments comprise stainless steel fibers.

14. A method as defined in claim 8 wherein thermoplastic adhesive comprises poly(ethyl oxazoline).

15. A method as defined in claim 14 wherein the poly(ethyl oxazoline) has a molecular weight in the range of from about 50,000 to about 500,000.

16. A method as defined in claim 6 wherein said coupling agent comprises N-(2-aminoethyl)-3-aminopropyltrimethoxy silane.

17. A method as defined in claim 7 wherein the polymeric plasticizer comprises poly(ethylene glycol).

18. A method as defined in claim 17 wherein said poly(ethylene glycol) has a molecular weight is the range of from about 200 to about 600.

19. A method of manufacturing injection molding granules of dispersible filaments comprising the steps of continuously passing reinforcing filaments through at least one bath of a thermally stable, readily melting film forming thermoplastic adhesive consisting of a poly(C$_2$–C$_6$ oxazoline), alone or in further combination with a polymeric plasticizer, in a liquid medium to impregnate the filaments, passing the impregnated filaments through a sized opening to remove any excess adhesive, passing the treated filaments into a heating zone first to evaporate the liquid medium and then to flux the thermoplastic adhesive, and withdrawing the treated filaments from said zone and thereafter chopping them into elongated granules whereby there are produced granules comprising 67.5–97.5% by volume of reinforcing filaments extending generally parallel to each other longitudinally of the granule and substantially uniformly dispersed throughout said granule in from 2.5–32.5% by volume of said thermoplastic adhesive wherein substantially surrounds each said filaments.

* * * * *